Patented July 10, 1945

2,380,036

UNITED STATES PATENT OFFICE 2,380,036

DESICCATION OF CITRUS FRUIT JUICES

Earl W. Flosdorf, Upper Darby, Pa., assignor to Lyophile-Cryochem Company, Philadelphia, Pa., a corporation of Pennsylvania No Drawing. Application July 17, 1943, Serial No. 495,211

5 Claims. (Cl. 99—206)

This invention relates to improvements in the preservation of citrus fruit juices, and particularly orange juice, by desiccation from the frozen state.

Processes for the desiccation of various labile aqueous materials by desiccation from the frozen state are well known, and are now used to a considerable extent for the preservation of biologicals. Application of such processes to the preservation of citrus fruit juices, and in particular orange juice, have not been particularly successful.

In the application of myself, Charles J. Westin and Frances J. Stokes, Jr., Serial No. 219,858, filed July 18, 1938, an effective method for the preservation of orange juice by this process is described. The procedure therein described involves reducing the orange juice to a final moisture content of less than 0.15%, and maintaining it at that low moisture content. This procedure is effective providing the desiccated product is kept relatively cool. If its temperature is permitted to rise to 100° F. or thereabouts, even products having this low moisture content tend to become gummy and difficult to dissolve in water. Also, it is time-consuming to reduce the moisture content to such a low figure and difficult to keep it there, because the material is hygroscopic and tends to absorb water from the air.

Addition of a small amount, such as 1 or 2%, of gelatin or the like to the orange juice before desiccating it is also helpful. A product containing a small amount of gelatin, when thoroughly dried, e. g., to 1% or lower moisture content, can be raised in temperature to around 100° F. and still retain its crystalline appearance and its property of dissolving readily in water. Such a product is, however, not entirely satisfactory because of the added gelatin, as there is a tendency to form a jelly upon reconstitution, in droplets or in small balls, particularly if the gelatin is added in amount sufficient to maintain the crystals in a soluble condition during storage at higher temperatures, such as 100 to 130° F.

In accordance with the present invention, there is added to the citrus fruit juice, prior to freezing and desiccation, a small amount of a crystallizable sugar, usually glucose, although other crystallizable sugars, such as sucrose, may be used. About 1 to 2½% of such sugar, based on the juice, gives very satisfactory results, although somewhat more or even less may be used.

Gelatin, pectin, agar agar, or other similar protective colloid may be added along with the sugars in amounts of 0.1 to 2%. These seem to stabilize the product even further when it is dried, but also give a product which, to many persons, has improved characteristics of flavor upon reconstitution. The quantity added must be insufficient to cause jellying upon reconstitution, but the added sugars minimize this tendency, particularly if the added colloid is less than 1½ to 2% in amount.

When sugar is added in this way and the product is desiccated from the frozen state in the known way, a desiccated product is obtained which is readily soluble in water and which is quite resistant to exposure to relatively high temperatures, for example 100–110° F., for considerable periods of time without becoming gummy and difficult to dissolve in water. The product is, however, hygroscopic, and must be handled in such a way that its water content is not increased by absorption to greater than about 1%. If all absorption of water from the air after the desiccation operation is completed can be prevented, desiccation to a 1% water content gives a very satisfactory product which, when hermetically sealed in cans or the like, may be stored for long periods of time even in warm climates, without refrigeration, and without losing its advantageous properties. If some absorption of water prior to sealing is a necessary incident to the packaging operation, the desiccation should be to a water content below 1%, so that the water content of the final product does not exceed about 1%.

Similar addition of small quantities of sugar to lemon juice permits its desiccation in the same way and with the production of a satisfactory product although somewhat larger quantities of sugar, for example up to about 5%, are advantageously used.

With grapefruit juice a satisfactory product can be obtained without the addition of any sugar, but a greatly improved and more resistant product is obtained if a small quantity of sugar is added to the grapefruit juice before the desiccation.

The reason for the improved results obtained is not presently known. It cannot be due to the total sugar content of the fruit juice or even the total glucose or total crystallizable sugar content. The total sugar content of orange juice varies from about 4% to about 10%, depending upon the type of orange and the season, while the total of the non-reducing sugars varies from about 1.5 to about 5% and of reducing sugars calculated as glucose from about 2.5 to 4.7%. With grapefruit juice the sugar content is about 7% and with lemon juice about 2.3%. The amount of sugar added to orange juice, for example, in accordance with the present invention is less than the normal seasonal and variety variations, and yet no noticeable differences have been detected between the behavior of orange juice with a low sugar content and orange juice with a high sugar content when processed without added sugar or when processed with added sugar. In other words, the successful results obtained in the practice of the present invention do not depend upon an adjustment of the sugar content of the juice, as juices with a naturally small sugar content, even with the addition of sugar in accordance with this invention, may be desiccated to give a satisfactory product, while juices with a natural high sugar content will not give a satisfactory product in the absence of added sugar (unless, of course, other precautions, such as reducing the moisture content below 0.15% or adding gelatin or the like, are used).

I claim:

1. In the desiccation of citrus fruit juices by sublimation of water therefrom from the frozen state, the step of adding to the juice before freezing a small amount of a crystallizable sugar to prevent the desiccated juice from becoming gummy and difficultly soluble in water at temperatures in the range of 100–110° F.

2. In the desiccation of citrus fruit juices by sublimation of water therefrom from the frozen state, the step of adding to the juice before freezing a small amount of glucose to prevent the desiccated juice from becoming gummy and difficultly soluble in water at temperatures in the range of 100–110° F.

3. In the desiccation of orange juice by sublimation of water therefrom from the frozen state, the step of adding to the juice before freezing a small amount of a crystallizable sugar to prevent the desiccated juice from becoming gummy and difficultly soluble in water at temperatures in the range of 100–110° F.

4. In the desiccation of orange juice by sublimation of water therefrom from the frozen state, the step of adding to the juice before freezing a small amount of glucose to prevent the desiccated juice from becoming gummy and difficultly soluble in water at temperatures in the range of 100–110° F.

5. In the desiccation of citrus fruit juices by sublimation of water therefrom from the frozen state, the step of adding to the juice before freezing a small amount of a crystallizable sugar and a small amount of a protective colloid to prevent the desiccated juice from becoming gummy and difficultly soluble in water at temperatures in the range of 100–110° F.

EARL W. FLOSDORF.